United States Patent
Rudisill et al.

(10) Patent No.: US 10,632,400 B2
(45) Date of Patent: Apr. 28, 2020

(54) HEAVY METAL SEPARATIONS USING STRONGLY PARAMAGNETIC COLUMN PACKINGS IN A NONHOMOGENEOUS MAGNETIC FIELD

(71) Applicant: Savannah River Nuclear Solutions, LLC, Aiken, SC (US)

(72) Inventors: Tracy S. Rudisill, North Augusta, SC (US); Fernando F. Fondeur, North Augusta, SC (US); Lindsay E. Roy, Aiken, SC (US); William E. Daniel, Jr., North Augusta, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 242 days.

(21) Appl. No.: 15/837,726

(22) Filed: Dec. 11, 2017

(65) Prior Publication Data

US 2019/0176056 A1 Jun. 13, 2019

(51) Int. Cl.
*B01D 15/38* (2006.01)
*G21F 9/12* (2006.01)
(Continued)

(52) U.S. Cl.
CPC ............ *B01D 15/3885* (2013.01); *C22B 3/24* (2013.01); *C22B 7/005* (2013.01); *C22B 59/00* (2013.01);
(Continued)

(58) Field of Classification Search
CPC ....... C22B 60/0295; C22B 7/005; C22B 3/24; C22B 60/0252; C22B 60/0291;
(Continued)

(56) References Cited

U.S. PATENT DOCUMENTS

| 555,792 A | 3/1896 | Wetherill |
| 2,943,739 A * | 7/1960 | Maynard ................ B01D 35/06 210/223 |

(Continued)

FOREIGN PATENT DOCUMENTS

| JP | 56062558 | 5/1981 |
| JP | 2002357594 | 12/2002 |
| WO | WO 2013113990 | 8/2013 |

OTHER PUBLICATIONS

Ghiorso et al., Sassy, a Gas-Filled Magnetic Separator for the Study of Fusion Reaction Products, Nuclear Instruments and Methods in Physics Research, vol. A269, 1988, pp. 192-201.
(Continued)

*Primary Examiner* — Tima M. McGuthry-Banks
(74) *Attorney, Agent, or Firm* — Dority & Manning, P.A.

(57) ABSTRACT

The present invention is directed to a method for the separation of an actinide from another metal. The method comprises the following steps: (a) establishing a non-homogeneous magnetic field across a separation column containing a paramagnetic packing material and (b) providing a fluid containing the actinide and the another metal to the separation column wherein the fluid and the paramagnetic packing material are exposed to the non-homogeneous magnetic field. The non-homogeneous magnetic field is produced by a magnet having a first pole for magnetic interaction with a second pole of the magnet wherein the first pole has a different surface area than the second pole. The non-homogeneous magnetic field has a magnetic field gradient of about 500 lines/cm$^2$/cm or more. In addition, the present invention is also directed to a method for the separation of one heavy metal from another heavy metal.

19 Claims, 1 Drawing Sheet

(51) Int. Cl.

| | |
|---|---|
| *C22B 60/04* | (2006.01) |
| *C22B 60/02* | (2006.01) |
| *G01N 27/72* | (2006.01) |
| *C22B 3/24* | (2006.01) |
| *C22B 7/00* | (2006.01) |
| *B01D 15/18* | (2006.01) |
| *C22B 59/00* | (2006.01) |

(52) U.S. Cl.
CPC ...... *C22B 60/0252* (2013.01); *C22B 60/0295* (2013.01); *C22B 60/04* (2013.01); *G01N 27/72* (2013.01); *G21F 9/12* (2013.01); *B01D 15/1821* (2013.01)

(58) Field of Classification Search
CPC .... C22B 60/04; B01D 15/3885; G01N 27/72; B03C 1/002
See application file for complete search history.

(56) References Cited

U.S. PATENT DOCUMENTS

| | | | |
|---|---|---|---|
| 3,684,090 | A | 8/1972 | Kilbride |
| 4,046,680 | A | 9/1977 | Fritz |
| 4,102,780 | A | 7/1978 | Sun et al. |
| 4,119,410 | A | 10/1978 | Kindig et al. |
| 4,129,498 | A | 12/1978 | Clark et al. |
| 4,205,979 | A | 6/1980 | Kindig et al. |
| 4,229,209 | A | 10/1980 | Kindig et al. |
| 4,239,619 | A | 12/1980 | Aplan et al. |
| 4,261,815 | A | 4/1981 | Kelland |
| 4,289,528 | A | 9/1981 | Kindig et al. |
| 4,526,681 | A | 7/1985 | Friedlaender et al. |
| 5,017,283 | A | 5/1991 | Oder |
| 5,186,827 | A | 2/1993 | Liberti et al. |
| 5,192,423 | A | 3/1993 | Duczmal et al. |
| 5,356,015 | A | 10/1994 | Notebaart et al. |
| 5,465,849 | A | 11/1995 | Wada et al. |
| 6,419,833 | B1 | 7/2002 | Lamoureux |
| 6,479,176 | B2 | 11/2002 | Leddy et al. |
| 6,514,575 | B2 | 2/2003 | Leddy et al. |
| 2004/0258591 | A1 | 12/2004 | Birken |
| 2006/0016728 | A1 | 1/2006 | Shorts et al. |
| 2011/0146544 | A1 | 6/2011 | Yaniv et al. |
| 2013/0284643 | A1 | 10/2013 | Birken |
| 2016/0089677 | A1* | 3/2016 | Cheng .................... B03C 1/031 209/214 |

OTHER PUBLICATIONS

Avens et al., Magnetic Separation as a Plutonium Residue Enrichment Process, Sixth Symposium on Separation Science and Technology for Energy Applications, Knoxville, Tennessee, Oct. 22-27, 1989, 39 pages.

Nunez et al., Actinide Separation of High-Level Waste Using Solvent Extractants on Magnetic Microparticles, ACS Symposium, Washington, DC, Aug. 22-26, 1994, 16 pages.

Andres et al., Selectivity in the magnetic separation of minerals, Powder Technology, vol. 79, 1994, pp. 147-158.

Avens et al., Use of High Gradient Magnetic Separation for Actinide Application, NATO Actinides & the Environment, Crete, Greece, Jul. 1996, 10 pages.

Blazy et al., Removal of ferriferous dolomite by magnetic separation from the Egyptian Abu Tartar phosphate ore, International Journal of Mineral Processing. vol. 49, 1997, pp. 49-58.

Gruttner et al., Dendrimer-coated magnetic particles for radionuclide separation, Journal of Magnetism and Magnetic Materials, vol. 293, Mar. 5, 2005, pp. 559-566.

Shaibu, et al., Evaluation of Cyanex 923-coated magnetic particles for the extraction and separation of lanthanides and actinides from nuclear waste streams, Journal of Magnetism and Magnetic Materials, vol. 301, Aug. 9, 2005, pp. 312-318.

Zou et al., Cell-sorption of paramagnetic metal ions on a cell-immobilized micro-column in the presence of an external magnetic field, ScienceDirect, vol. 598, Jul. 13, 2007, pp. 74-81.

Fondeur et al., The Effect of Magnetic Fields on Uranium and Strontium Sorption on Monosodium Titanate, Separation Science and Technology, vol. 45:12-13, Aug. 30, 2010, pp. 1876-1879.

Gruttner et al., Selective Extraction of Lanthanides and Actinides by Magnetic Silica Particles with CMPO-Modified Calix[4]Arenes on the Surface, European Cells and Materials, vol. 3, Suppl. 2, 2002, pp. 48-51.

Hong et al., Periodic permanent magnet focusing system with high peak field, Journal of Magnetism and Magnetic Materials, vol. 320, Issue 10, May 2008, pp. 1675-1679.

* cited by examiner

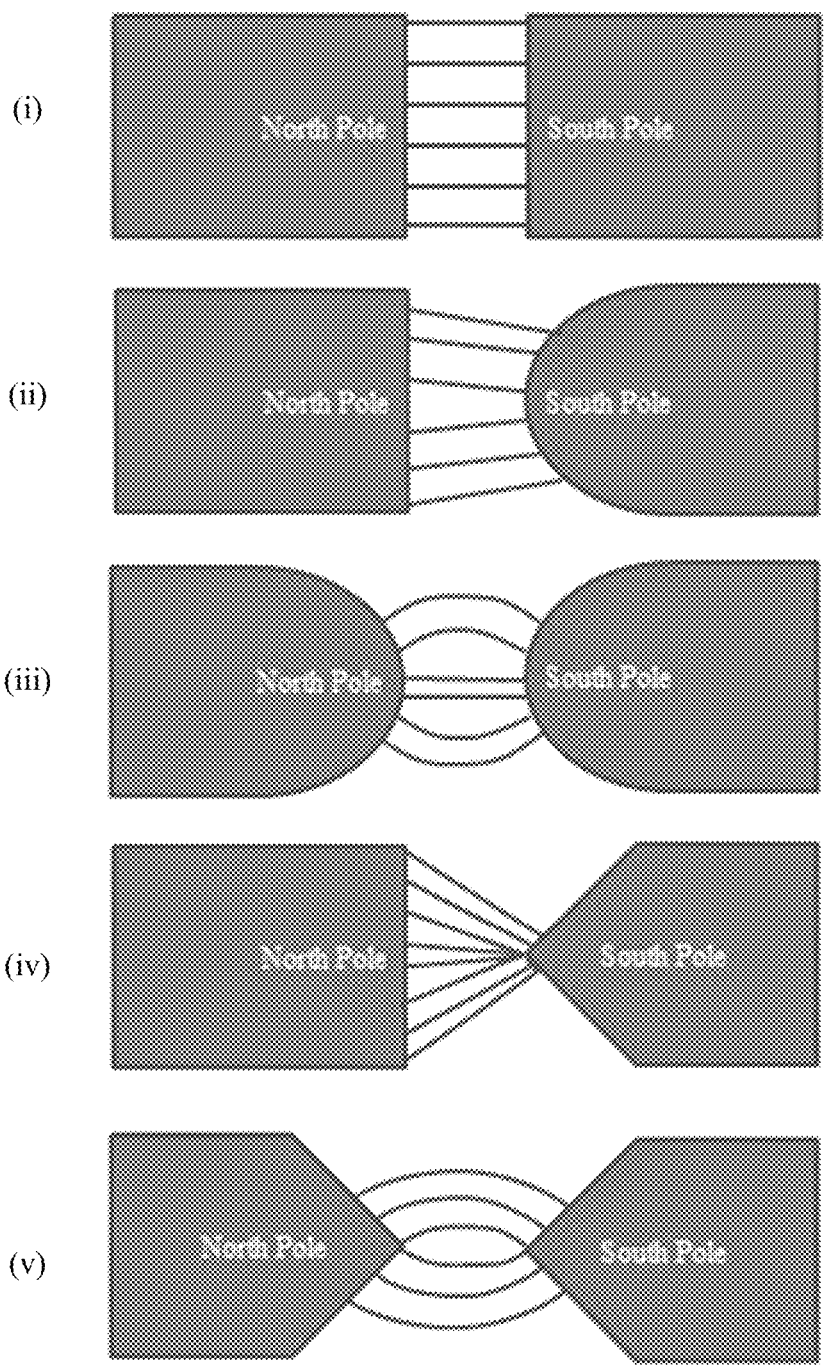

HEAVY METAL SEPARATIONS USING STRONGLY PARAMAGNETIC COLUMN PACKINGS IN A NONHOMOGENEOUS MAGNETIC FIELD

FEDERAL RESEARCH STATEMENT

This invention was made with Government support under Contract No. DE-AC09-085R22470, awarded by the U.S. Department of Energy. The Government has certain rights in the invention.

BACKGROUND OF THE INVENTION

Nuclear fission is the process in which the nucleus of an atom splits into smaller nuclei and releases a large amount of energy. During such process, various fission products are generated. In certain instances, such generation may require further processing, such as separation, because of the presence of radioactive and/or toxic materials.

As an example, fission products mixed with actinides require further processing to recover the energy value of the actinides and facilitate regulatory requirements associated with waste disposal. The recovery of such actinides from nuclear waste generated as a result of the nuclear fuel cycle is an area of importance. Separation of the actinides from the nuclear waste can allow for the recovery of the energy value of the actinides and decrease the radiotoxicity of the waste.

Various methods have been implemented to separate the actinides from other fission products, such as lanthanides and other metals. For instance, some methods are directed to solvent extraction; however, such methods have not been demonstrated on an industrial scale and may require large volumes of organic solvent which are susceptible to radiation and chemical damage generating large volumes of radioactively contaminated organic waste. Ion exchange processes have also been employed to separate actinides from lanthanides; however, such processes have not been used for large-scale separation processes.

As a result, there is a need for an improved method that allows for the separation of one heavy metal from another heavy metal, such as an actinide from another metal.

SUMMARY OF THE INVENTION

Aspects and advantages of the invention will be set forth in part in the following description, or may be apparent from the description, or may be learned through practice of the invention.

In accordance with one embodiment of the present invention, a method for the separation of an actinide from another metal is disclosed. The method comprises the following steps: (a) establishing a non-homogeneous magnetic field across a separation column containing a paramagnetic packing material and (b) providing a fluid containing the actinide and the another metal to the separation column wherein the fluid and the paramagnetic packing material are exposed to the non-homogeneous magnetic field. The non-homogeneous magnetic field is produced by a magnet having a first pole for magnetic interaction with a second pole of the magnet wherein the first pole has a different surface area than the second pole. The non-homogeneous magnetic field has a magnetic field gradient of about 500 lines/cm$^2$/cm or more.

In accordance with another embodiment of the present invention, a method for the separation of a first heavy metal from a second heavy metal is disclosed. The method comprises the following steps: (a) establishing a non-homogeneous magnetic field across a separation column containing a paramagnetic packing material and (b) providing a fluid containing the first heavy metal and the second heavy metal to the separation column wherein the fluid and the paramagnetic packing material are exposed to the non-homogeneous magnetic field. The non-homogeneous magnetic field is produced by a magnet having a first pole for magnetic interaction with a second pole of the magnet wherein the first pole has a different surface area than the second pole. The non-homogeneous magnetic field has a magnetic field gradient of about 500 lines/cm$^2$/cm or more.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides an illustration of various magnetic pole configurations.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally speaking, one embodiment of the present invention is directed to the separation of an actinide from another metal. In particular, such separation is conducted on the basis of the difference in magnetic susceptibility between actinides and other metals. The present inventors have discovered that separating the actinides from other metals based on magnetic susceptibility and using the method disclosed herein can be an efficient and effective process.

While the present specification has been focused on the separation of actinides from lanthanides, in particular lanthanide fission products, it should be understood that the general method can be employed to separate any elements with substantial differences in magnetic susceptibility. As a result, the disclosure provided herein is not necessarily limited to the separation of actinides. In other words, the method disclosed herein can be employed to separate one heavy metal from another heavy metal.

For instance, without intending to be limited by theory, the net velocity of those metals with a higher magnetic susceptibility may be reduced as a fluid traverses through a separation column in comparison to metals with a lower magnetic susceptibility. In general, those ions with a higher magnetic susceptibility can interact within the magnetic field with the packing material for a greater period of time than those ions with a lower magnetic susceptibility.

In general, actinides have a lower magnetic susceptibility in comparison to other heavy metals, such as lanthanides. For instance, the magnetic susceptibility of one heavy metal, such as a lanthanide, may be at least 10 times greater, such as at least about 20 times greater, such as at least about 50 times greater, such as at least about 75 times greater, such as at least about 100 times greater than the magnetic susceptibility of another heavy metal, such as an actinide.

Furthermore, lanthanides may have a magnetic moment (Bohr Magneton) of 2.0 or more, such as 2.5 or more, such as 3 or more, such as 3.5 or more. Meanwhile, actinides may have a magnetic moment of less than 2.5, such as 2.0 or less, such as 1.8 or less, such as 1.6 or less, such as 1.5 or less, such as 1.4 or less. As a result, at least in comparison to lanthanides, the actinides would traverse through a separation column relatively quicker than lanthanides when exposed to a magnetic field. However, the present inventors have discovered that manipulating the magnetic field as disclosed herein can provide a more effective and efficient separation of one heavy metal, such as an actinide, from other heavy metals.

In general, the actinides include actinium, thorium, protactinium, uranium, neptunium, plutonium, americium, curium, berkelium, californium, einsteinium, fermium, mendelevium, nobelium, lawrencium, or mixtures thereof. In one embodiment, the actinides may include actinium, thorium, protactinium, uranium, neptunium, plutonium, americium, curium, or mixtures thereof. In another embodiment, the actinides may include americium, curium, or mixtures thereof.

In general, the other metals may include any other metal not considered an actinide. For instance, the other metal may be a metal lighter than the actinide. As an example, the other metal may include a lanthanide. In general, the other metal can have a magnetic susceptibility that is higher than that of the actinides. In addition, it should be understood that the aforementioned heavy metals are known in the art are not necessarily limited. For instance, the heavy metals may include titanium, vanadium, chromium, manganese, iron, cobalt, nickel, copper, zinc, gallium, germanium, arsenic, zirconium, niobium, molybdenum, technetium, ruthenium, rhodium, palladium, silver, cadmium, indium, tin, tellurium, lutetium, hafnium, tantalum, tungsten, rhenium, osmium, iridium, platinum, gold, mercury, thallium, lead, bismuth, polonium, astatine, lanthanum, cerium, praseodymium, neodymium, promethium, samarium, europium, gadolinium, terbium, dysprosium, holmium, erbium, thulium, ytterbium, actinium, thorium, protactinium, uranium, neptunium, plutonium, americium, curium, berkelium, californium, einsteinium, fermium, nobelium, radium, lawrencium, rutherfordium, dubnium, seaborgium, bohrium, hassium, meitnerium, darmstadtium, roentgenium, copernicium, etc.

Regardless, the present method disclosed herein may allow for separation of at least 50%, such as at least 60%, such as at least 70%, such as at least 80%, such as at least 90%, such as at least 95%, such as at least 98%, such as at least 99% of at least one heavy metal from one or more metals in a fluid. In particular, the present method disclosed herein may allow for separation of at least 50%, such as at least 60%, such as at least 70%, such as at least 80%, such as at least 90%, such as at least 95%, such as at least 98%, such as at least 99% of actinides from one or more metals in a fluid.

A. Method for Separation

In general, a fluid containing the heavy metals, such as actinides, is passed through a separation column containing a paramagnetic packing material. The separation column is not limited and may be any type of separation column generally employed in the art, such as a chromatography column. Furthermore, the separation may be performed according to a simulated moving bed process as generally known in the art. Regardless, a non-homogeneous magnetic field as defined herein is established across the column such that the fluid passes through the magnetic field.

The fluid may not necessarily be limited. For instance, the fluid may be an aqueous solution, an acidic solution, a basic solution, or an organic solvent based solution. In one embodiment, the fluid may be an aqueous solution. In another embodiment, the fluid may be an acidic solution, such as a nitric acid solution. However, it should be understood that other types of acidic solutions may also be employed. In another embodiment, the fluid may be a basic solution. In another embodiment, the fluid may be a solvent, such as an organic solvent. In general, the heavy metals, such as the actinides may be present as ions in the fluid; that is, the heavy metals should have solubility within the fluid.

In general, the method disclosed herein is a continuous flow system such that the separation of the heavy metals, such as the actinides, is continuous and can be controlled by the flow rate of the fluid, the column size, and the magnetic field. However, even though at least one heavy metal, such as an actinide, is being separated, the other metals, such as the lanthanides, that are interacting due to the presence of the magnetic field may also be traversing through the column; however, they may just be traversing through the column at a relatively lower rate.

The fluid may flow through the column at a rate that allows for sufficient interaction of the other heavy metals, such as the lanthanides, within the column thus enabling separation of the desired heavy metals, such as the actinides. Such flow rate may depend on various factors such as the magnetic field gradient, type and size of packing material, type and size of column. In addition, the flow rate of the fluid may depend upon the desired throughput. In general, the fluid flow through the column may be a laminar flow, as determined in the art based on the Reynolds Number. Generally, as known in the art, the Reynolds Number is a function of column diameter, fluid velocity, and solution properties (e.g., density and viscosity).

The separation column may be a single pass column or a multipass column. In one embodiment, the separation column may be a single pass column. In another embodiment, the separation column may be a multipass column. Additionally, it should be understood that the total length of the column, whether single pass or multipass, can be manipulated in order to delay the break-through of the heavy metals with high magnetic susceptibility, such as the lanthanides. Furthermore, it should also be understood that a sufficient length of the column should be in the magnetic field to delay the break-through of the high magnetic susceptibility metals after the break-through of the desired heavy metals, such as the actinides. For instance, in one embodiment, at least 90%, such as at least 95%, such as at least 98%, such as at least 99%, such as 100% of the length of the column should be in the magnetic field.

The residence time of the fluid in the column may also vary depending on the size of the column. However, in general, the residence time may be about 0.1 hours or more, such as about 0.3 hours or more, such as about 0.5 hours or more, such as about 1 or more to about 3 hours or less, such as about 2 hours or less, such as about 1.5 hours or less, such as about 1 hour or less, such as about 0.5 hours or less.

Temperature may also have an effect on the magnetic separation. For instance, operation at lower temperature may be advantageous because magnetic susceptibility of the molecular species increases as reciprocal temperature. As an example and without intending to be limited by theory, reducing the temperature from room temperature to just above freezing may increase the magnetic moment by about 10%. As a result, thermal gradients may be exploited to drive magnetic separations. In this regard, the current methods disclosed herein may be conducted at a temperature of about 40° C. or less, such as about 35° C. or less, such as about 30° C. or less, such as about 20° C. or less, such as about 10° C. or less, such as about 5° C. or less. The temperature may generally be greater than 0° C., such as 1° C. or more, such as 2° C. or more, such as 3° C. or more, such as 4° C. or more, such as 5° C. or more.

Additionally, the use of complexants, such as ligands, may also affect the magnetic properties of the heavy metals, such as the actinides. In particular, ligands may form a stable complex with the heavy metals, such as the actinides. Such change may improve the separation efficiency and affect the magnetic susceptibility. It should be understood that the complexant is not necessarily limited and any complexant for such application known in the art can be employed.

Various techniques may also be employed to improve the separation efficiency of the heavy metals, such as the actinides. For instance, the method may employ multiple stages or recycle streams. In one embodiment, the method employs multiple stages. In another embodiment, the method employs recycle streams. In another embodiment, the method employs multiple stages and recycle streams.

The method disclosed herein allows for desired heavy metals, such as the actinides, to be separated and/or concentrated. Such concentration may allow for reduction in volume that can be easier to manage and contain. It should be understood that such concentrated fluid may also contain other metals. For instance, such metals may have a similar, lower, or relatively higher magnetic susceptibility than the desired heavy metals, such as the actinides.

B. Magnetic Field

As indicated above, a non-homogeneous magnetic field is externally applied to the column and the fluid in a direction perpendicular to the flow direction. According to the present invention, a generally strong, non-homogeneous magnetic field may be employed.

Regarding strength, the magnetic field intensity may be 0.5 Tesla or more, such as 0.6 Tesla or more, such as 0.7 Tesla or more, such as 0.8 Tesla or more, such as 0.9 Tesla or more, such as 1 Tesla or more. Nevertheless, it should be understood that the magnetic field intensity may not necessarily be limited.

Regarding non-homogeneity, the present invention employs a certain magnetic pole configuration. In general, magnets have a north pole and a south pole. In the present invention, a magnet was employed for generating the magnetic field. According to the present invention, both interacting poles of the magnet may not be flat/horizontal (i.e., both poles may not be 100% planar); that is, one of the poles is non-planar. For instance, if the north pole or the south pole is flat/horizontal, then the other pole may not be flat/horizontal. Alternatively, in another embodiment, two magnets may be employed wherein the aforementioned pole configurations are satisfied.

Illustrations of the magnetic pole configurations are further illustrated in FIG. 1. As indicated in FIG. 1, example (i) illustrates a magnetic pole configuration wherein both the north pole and the south pole of the magnet are flat/horizontal (i.e., both poles are 100% planar). The present inventors have, however, discovered that when at least one of the poles is not flat/horizontal (i.e., 100% planar), the ability to separate the desired heavy metals, such as the actinides, from other metals, such as lanthanides, is further enhanced. In other words, generally, by reducing the area of the magnetic pole in which the magnetic lines are concentrated, the magnetic lines are intensified thereby resulting in enhancement of the separation of the desired heavy metals, such as the actinides, from other metals. Thus, in one embodiment, the poles of the magnet have different surface area; that is, one pole has a larger surface area than the other pole.

In FIG. 1, examples (ii) and (iv) illustrate an embodiment wherein only one of the poles is flat/horizontal. Meanwhile, in example (ii), the other pole has a parabolic configuration while in example (iv) the other pole has a triangular configuration such that the magnetic lines are spread within the vicinity of a vertice (or triangular point). In Example (iii), both poles have a parabolic configuration. Meanwhile, in example (v), both poles have a triangular configuration with a vertice (or triangular point).

The ability to provide the aforementioned magnetic pole configurations allows for a concentration of the magnetic lines in comparison to an embodiment wherein both poles are flat/horizontal. For instance, in example (i), the magnetic lines simply extend linearly across from one pole to the other pole. That is, the magnetic lines extend linearly across such that the lines are perpendicular to the fluid flow and/or the column. Meanwhile, in examples (ii)-(v), while the magnetic lines may extend linearly in some instances, they do not extend linearly across. That is, the magnetic lines do not extend linearly across such that the lines are not perpendicular to the fluid flow and/or the column. Instead, the magnetic lines are more concentrated within a certain area of at least one of the poles than if both poles were flat/horizontal.

In this regard, the method of the present invention may include a non-homogeneous magnetic field with a magnetic field gradient higher than that generated using the magnetic field of example (i) in FIG. 1. For instance, the magnetic field gradient may be about 500 lines/cm$^2$/cm (gap) or more, such as about 600 lines/cm$^2$/cm or more, such as about 700 lines/cm$^2$/cm or more, such as about 800 lines/cm$^2$/cm or more, such as about 900 lines/cm$^2$/cm or more, such as about 1,000 lines/cm$^2$/cm or more. The magnetic field gradient may be about 3,000 lines/cm$^2$/cm or less, such as about 2,500 lines/cm$^2$/cm or less, such as about 2,000 lines/cm$^2$/cm or less, such as about 1,800 lines/cm$^2$/cm or less, such as about 1,600 lines/cm$^2$/cm or less, such as about 1,500 lines/cm$^2$/cm or less, such as about 1,400 lines/cm$^2$/cm or less, such as about 1,300 lines/cm$^2$/cm or less. In general, the magnetic field gradient may be determined according to any method generally known in the art.

C. Paramagnetic Packing Material

The present invention also requires the use of a paramagnetic packing material within the separation column. It should be understood that the type of paramagnetic packing material is not entirely limited and that any paramagnetic packing material known in the art may be employed so long as the objectives of the invention disclosed herein are satisfied.

In general, a paramagnetic packing material is one having a relatively small, positive susceptibility to a magnetic field. These materials can be attracted by a magnetic field and may not retain the magnetic properties when the external field is removed. Such paramagnetism can be due to the presence of some unpaired electrons and/or the realignment of the electron paths caused by the external magnetic field. The paramagnetic packing material may refocus the magnetic field which may intensify the interaction of the ion with the highest susceptibility thereby retarding the ion's movement through the column.

The paramagnetic packing material can be a metallic, paramagnetic packing material. For instance, in one embodiment, the paramagnetic packing material may be a metal, a metal alloy, or a combination thereof. The paramagnetic packing material may include, but is not limited to, ferrites (e.g., strontium hexaferrite), oxides (e.g., iron (II) oxide, iron (III) oxide, chromium (III) oxide, chromium trioxide, uranium dioxide, plutonium (IV) oxide, nickel (III) oxide, etc.), metals (e.g., aluminum, platinum, plutonium, uranium, thorium, americium, gold, copper, magnesium, molybdenum, lithium, tantalum, calcium, etc.), clays (e.g., montmorillonite, nontronite), biotite, siderite, pyrite, etc. or combinations thereof. In one embodiment, the paramagnetic packing material is a ferrite material.

In another embodiment, the paramagnetic packing material may be a paramagnetic packing material that includes magnetic particles encapsulated on non-metal or non-metal alloy particles, for example silica particles. In this regard, the paramagnetic packing material may be silica particles encapsulated with paramagnetic particles.

In general, the paramagnetic packing material may have a magnetic susceptibility of greater than 0, such as 0.1 or more, such as 0.2 or more, such as 0.3 or more, such as 0.4 or more, such as 0.5 or more, such as 0.75 or more, such as 1 or more. The paramagnetic packing material may have a magnetic susceptibility of 2 or less, such as 1.8 or less, such as 1.6 or less, such as 1.4 or less, such as 1.2 or less, such as 1.0 or less, such as 0.5 or less, such as 0.2 or less, such as 0.1 or less. Such a magnetic susceptibility can allow the paramagnetic packing material to accept more magnetic lines from a pole of the magnet, redirect the magnetic lines, and pack them into a highly dense array on the opposite pole.

In addition to the magnetic pole configurations, the geometry of the paramagnetic packing materials can also be manipulated to focus/intensify the magnetic lines. For instance, if the paramagnetic packing materials are relatively ordered within the separation column, such order may allow for focusing or intensification of the magnetic field lines and magnetic field gradient. In particular, in one embodiment, the paramagnetic packing material may be porous and/or permeable. Such porosity and/or permeability may allow for the fluid to flow through the packing and/or may allow for focusing and/or intensification of the magnetic lines of the magnetic field.

The paramagnetic packing material may be in any form as generally known in the art. For instance, the paramagnetic packing material may include plates, filamentary material (e.g., mesh, fibers, etc.); particulate material (e.g., spheres, pellets, particles), etc. However, it should be understood that other forms of materials may also be employed so long as the objectives of the present invention are satisfied.

In one embodiment, the paramagnetic packing material may have a regular (symmetric) geometry. In another embodiment, the paramagnetic packing material may have an irregular (asymmetric geometry); that is, there is not a single axis in which the paramagnetic packing material is symmetric.

The paramagnetic packing material may have a longest dimension of about 0.1 cm or more, such as about 0.2 cm or more, such as about 0.3 cm or more, such as about 0.4 cm or more, such as about 0.5 cm or more, such as about 0.6 cm or more, such as about 0.8 cm or more, such as about 1 cm or more, such as about 1.25 cm or more, such as about 1.4 cm or more. The paramagnetic packing material may have a longest dimension of about 3 cm or less, such as about 2.5 cm or less, such as about 2 cm or less, such as about 1.8 cm or less, such as about 1.6 cm or less, such as about 1.5 cm or less, such as about 1.4 cm or less, such as about 1.2 cm or less, such as about 1 cm or less, such as about 0.8 cm or less, such as about 0.6 cm or less.

However, it should be understood that the size of the paramagnetic packing material may be increased or decreased so long as the column size, size of the magnet, and/or the magnetic field strength are adjusted accordingly. For instance, the paramagnetic packing materials may have a longest dimension of at least about 2.5 cm, such as at least about 5 cm, such as at least about 10 cm, such as at least about 20 cm.

In one embodiment, the shortest dimension of the paramagnetic packing material should be perpendicular to the magnet and/or magnetic field while the longest dimension of the paramagnetic packing material should be parallel to the magnet and/or magnetic field. Such configuration may also assist in intensification of the magnetic lines and the magnetic field.

In addition to the above, the paramagnetic material may allow for refocusing of the magnetic field. Such refocusing may intensify the interaction of the ions with the higher magnetic susceptibility thereby retarding the ion's movement through the column.

D. Applications

In general, actinides can be present in various applications. Commonly, transuranic actinides are produced during nuclear fuel irradiation and can be present in nuclear waste. For instance, the method disclosed herein may be beneficial when reprocessing used reactor fuels. The transuranic actinides may also be the result of a transmutation process wherein they are generated by nuclear reactions during fuel irradiation. However, actinides, such as uranium and thorium, may also be present as a result of various mining, milling, and purification applications. As a result, the method disclosed herein is not intended to be limited to separating actinides from nuclear fuel or waste but instead can be employed for various other applications that may also require the separation of actinides.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A method for the separation of an actinide from another metal, the method comprising:
   establishing a non-homogeneous magnetic field across a separation column containing a paramagnetic packing material,
   providing a fluid containing ions of the actinide and the another metal to the separation column wherein the fluid and the paramagnetic packing material are exposed to the non-homogeneous magnetic field, separating the ions of the actinide from the ions of the another metal, wherein the non-homogeneous magnetic field is produced by a magnet having a first pole for magnetic interaction with a second pole of the magnet and wherein the first pole has a different surface area than the second pole, wherein the non-homogeneous magnetic field has a magnetic field gradient of about 500 lines/cm$^2$/cm or more.

2. The method of claim 1, wherein the magnetic field gradient is from about 500 lines/cm$^2$/cm to about 3,000 lines/cm$^2$/cm.

3. The method of claim 1, wherein the paramagnetic packing material has a longest dimension of from 0.4 cm to 2 cm.

4. The method of claim 1, wherein the paramagnetic packing material has a longest dimension of at least 2.5 cm.

5. The method of claim 1, wherein at least one pole has a non-planar surface.

6. The method of claim 5, wherein at least one pole has a parabolic surface.

7. The method of claim 5, wherein at least one pole has a vertice.

8. The method of claim 1, wherein at least 90% of the length of the separation column is within the non-homogeneous magnetic field.

9. The method of claim 1, wherein a magnetic susceptibility of the another metal is at least 10 times greater than a magnetic susceptibility of the actinide.

10. The method of claim 1, wherein the actinide comprises actinium, thorium, protactinium, uranium, neptunium, plutonium, americium, curium, or mixtures thereof.

11. The method of claim 1, wherein the actinide comprises americium, curium, or mixtures thereof.

12. The method of claim 1, wherein the another metal comprises a lanthanide.

13. The method of claim 1, wherein the paramagnetic packing material comprises a metal, a metal alloy, or a mixture thereof.

14. The method of claim 1, wherein the paramagnetic packing material comprises a ferrite.

15. The method of claim 1, wherein at least 90% of the actinide is separated from the fluid.

16. The method of claim 1, wherein the fluid passes through the separation column at a temperature of from greater than 0° C. to 40° C.

17. The method of claim 1, wherein the another metal is a fission product.

18. The method of claim 1, wherein the actinide is a product of transmutation.

19. A method for the separation of a first heavy metal from a second heavy metal, the method comprising:

establishing a non-homogeneous magnetic field across a separation column containing a paramagnetic packing material, providing a fluid containing ions of the first heavy metal and the second heavy metal to the separation column wherein the fluid and the paramagnetic packing material are exposed to the non-homogeneous magnetic field, separating the ions of the first heavy metal from the ions of the second heavy metal, wherein the non-homogeneous magnetic field is produced by a magnet having a first pole for magnetic interaction with a second pole of the magnet and wherein the first pole has a different surface area than the second pole, wherein the non-homogeneous magnetic field has a magnetic field gradient of about 500 lines/cm$^2$/cm or more.

* * * * *